(No Model.)
J. JENSEN.
END GATE ROD FOR VEHICLES.
No. 300,082. Patented June 10, 1884.
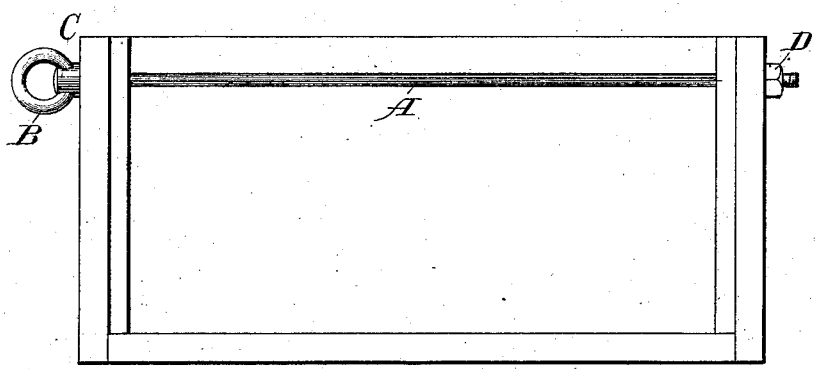
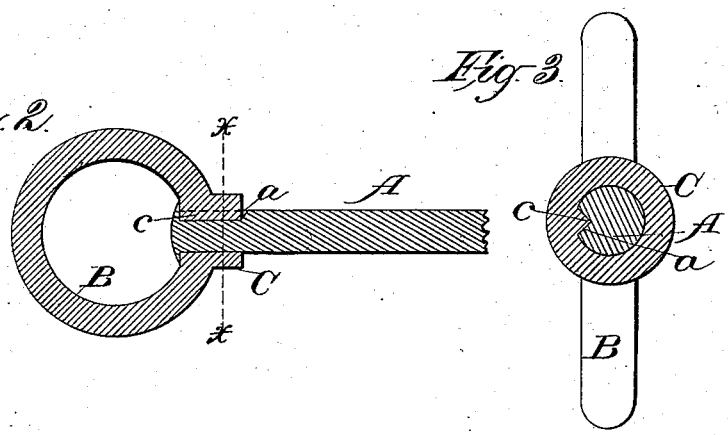
Witnesses:
E. G. Tomus
H. J. Forsythe
Inventor:
Jens Jensen
By Stout & Underwood
Attorneys.
N. PETERS. Photo-Lithographer. Washington, D. C.

UNITED STATES PATENT OFFICE.

JENS JENSEN, OF RACINE, WISCONSIN, ASSIGNOR TO THE JENSEN MANUFACTURING COMPANY, (LIMITED,) OF SAME PLACE.

END-GATE ROD FOR VEHICLES.

SPECIFICATION forming part of Letters Patent No. 300,082, dated June 10, 1884.

Application filed March 25, 1884. (No model.)

*To all whom it may concern:*

Be it known that I, JENS JENSEN, of Racine, in the county of Racine, and in the State of Wisconsin, have invented certain new and useful Improvements in End-Gate Rods for Vehicles; and I do hereby declare that the following is a full, clear, and exact description thereof.

My invention relates to rods used in securing the end-gates of vehicles; and it consists in certain peculiarities of construction, as will be more fully set forth hereinafter.

In the drawings, Figure 1 is a rear elevation of the end of a vehicle-body, showing one of my improved rods in place. Fig. 2 is a longitudinal sectional view of my device, and Fig. 3 is an enlarged cross-section on the line $x\ x$ of Fig. 2.

A is the end-gate rod proper, which is made the ordinary length, and in which is formed at one end a V-shaped groove or depression, $a$.

B is the ring, cast solidly with a sleeve or collar, C, which has on its inner periphery a corresponding V-shaped projection, adapted to fit closely within the groove $a$ when the end of the rod is pushed into the said collar. The groove $a$ is only of sufficient length to enable the rod to project into the circle of the ring B a sufficient distance to be upset over the inner end of the collar C, and hence the end of the groove forms a stop for the outer end of the projection $c$ of the collar C, and when the parts are thus put together they can be secured by welding or by upsetting the projecting end of the rod A, or both. The other end of the rod A is screw-threaded and provided with nut D, and the end-gate rod is used in the ordinary manner.

A great advantage of my device lies in the fact that the ring and rod become inseparable, and if the nut D becomes rusted to place or sticks badly at any time it can easily be removed by thrusting a stick through the ring B, to keep the rod in one position, while a wrench is applied to the said nut, or vice versa, by thus keeping the nut steady and turning the rod from its ring, and this without the slightest danger of turning the ring or head off the rod, besides which my device is simple and inexpensive and can be readily made.

Of course the groove $a$ and projection $c$ might be of other form than the described V shape; but they must correspond to each other, and the shape named is a desirable one in ordinary cases.

Having thus described my invention, what I claim as new, and desire to secure by Letters Patent, is—

An end-gate rod for vehicles, consisting of the rod A, provided at one end with the groove $a$, and the ring B, having collar C, with projection $c$, corresponding to said groove, substantially as set forth.

In testimony that I claim the foregoing I have hereunto set my hand, at Milwaukee, in the county of Milwaukee and State of Wisconsin, in the presence of two witnesses.

JENS JENSEN.

Witnesses:
STANLEY S. STOUT,
H. G. UNDERWOOD.